United States Patent
Brown et al.

(10) Patent No.: US 12,026,892 B2
(45) Date of Patent: Jul. 2, 2024

(54) FIGURE-GROUND NEURAL RADIANCE FIELDS FOR THREE-DIMENSIONAL OBJECT CATEGORY MODELLING

(71) Applicant: Google LLC, Mountain View, CA (US)

(72) Inventors: Matthew Alun Brown, Vancouver (CA); Ricardo Martin-Brualla, Seattle, WA (US); Keunhong Park, Seattle, WA (US); Christopher Derming Xie, London (GB)

(73) Assignee: GOOGLE LLC, Mountain View, CA (US)

( * ) Notice: Subject to any disclaimer, the term of this patent is extended or adjusted under 35 U.S.C. 154(b) by 169 days.

(21) Appl. No.: 17/551,724

(22) Filed: Dec. 15, 2021

(65) Prior Publication Data
US 2023/0130281 A1    Apr. 27, 2023

Related U.S. Application Data
(60) Provisional application No. 63/270,118, filed on Oct. 21, 2021.

(51) Int. Cl.
  *G06T 7/194*    (2017.01)
  *G06T 17/00*    (2006.01)

(52) U.S. Cl.
  CPC .............. *G06T 7/194* (2017.01); *G06T 17/00* (2013.01); *G06T 2207/20081* (2013.01); *G06T 2207/20084* (2013.01)

(58) Field of Classification Search
  None
  See application file for complete search history.

(56) References Cited

U.S. PATENT DOCUMENTS

| | | | |
|---|---|---|---|
| 2023/0106679 A1* | 4/2023 | Briggs | G06T 9/00 345/419 |
| 2023/0116417 A1* | 4/2023 | Taccari | G06V 10/774 706/15 |

OTHER PUBLICATIONS

Agnew et al., "Amodal 3D Reconstruction for Robotic Manipulation via Stability and Connectivity", CoRL 2020 : Conference on Robot Learning, Nov. 16-18, 2020, Virtual, 11 pages.

Ahmadyan et al., "Objectron: A large scale dataset of object-centric videos in the wild with pose annotations", Conference on Computer Vision and Pattern Recognition, Jun. 19-25, 2021, Nashville, TN, pp. 7822-7831.

(Continued)

*Primary Examiner* — Jeffrey J Chow
(74) *Attorney, Agent, or Firm* — DORITY & MANNING P.A.

(57) ABSTRACT

Systems and methods for three-dimensional object category modeling can utilize figure-ground neural radiance fields for unsupervised training and inference. For example, the systems and methods can include a foreground model and a background model that can generate an object output based at least in part on one or more learned embeddings. The foreground model and background model may process position data and view direction data in order to output color data and volume density data for a respective position and view direction. Moreover, the object category model may be trained to generate an object output, which may include an instance interpolation, a view synthesis, or a segmentation.

20 Claims, 10 Drawing Sheets

(56) References Cited

OTHER PUBLICATIONS

Blanz et al., "A Morphable Model for the Synthesis of 3D Faces", SIGGRAPH '99: 26th annual conference on Computer graphics and interactive techniques, Aug. 8-13, 1999, Los Angeles, CA, pp. 187-194.
Blender.Org, "Blender—a 3D Modelling and Rendering Package", http://www.huge-man-linux.net/man1/blender.html, retrieved on Dec. 16, 2021, Blender Foundation, Amsterdam, 2018, 2 pages.
Bojanowski et al., "Optimizing the Latent Space of Generative Networks", International Conference on Machine Learning, Jul. 10-15, 2018, Stockholm, Sweden, 10 pages.
Chang et al., "ShapeNet: An Information—Rich 3D Model Repository", arXiv:1512.03012v1, Dec. 9, 2015, 11 pages.
Choy et al., "3D-R2N2: A Unified Approach for Single and Multi-view 3D Object Reconstruction", European Conference on Computer Vision, Oct. 8-16, 2016, Amsterdam, The Netherlands, 17 pages.
Du et al., "SpineNet: Learning Scale-Permuted Backbone for Recognition and Localization", Conference on Computer Vision and Pattern Recognition, Jun. 14-19, 2020, Virtual, pp. 11592-11601.
Gadelha et al., "3D Shape Induction from 2D Views of Multiple Objects", arXiv:1612.05872v1, Dec. 18, 2016, 10 pages.
Gkioxari et al., "Mesh R-CNN", International Conference on Computer Vision, Oct. 27-Nov. 2, 2019, Seoul, Korea, pp. 9785-9795.
Goodfellow et al., "Generative Adversarial Nets", Conference on Neural Information Processing Systems, Dec. 8-13, 2014, Montreal, Canada, 9 pages.
He et al., "Mask R-CNN", International Conference on Computer Vision, Oct. 22-29, 2017, Venice, Italy, pp. 2961-2969.
Henzler et al., "Escaping Plato's Cave: 3D Shape From Adversarial Rendering", Conference on Computer Vision and Pattern Recognition, Jun. 16-20, 2019, Long Beach, CA, pp. 9984-9993.
Henzler et al., "Unsupervised Learning of 3D Object Categories from Videos in the Wild", Conference on Computer Vision and Pattern Recognition, Jun. 19-25, 2021, Nashville, TN, pp. 4700-4709.
Heusel et al., "GANs Trained by a Two Time-Scale Update Rule Converge to a Local Nash Equilibrium", Conference on Neural Information Processing Systems, Dec. 4-9, 2017, Long Beach, CA, 12 pages.
Kanazawa et al., "Learning Category-Specific Mesh Reconstruction from Image Collections", 15th European Conference on Computer Vision, Sep. 8-14, 2018, Munich, Germany, 16 pages.
Kar et al., "Category-Specific Object Reconstruction from a Single Image", Conference on Computer Vision and Pattern Recognition, Jun. 7-12, 2015, Boston, MA, pp. 1966-1974.
Kato et al., "Neural 3D Mesh Renderer", arXiv:1711.07566v1, Nov. 20, 2017, 17 pages.
Lombardi et al., "Neural Volumes: Learning Dynamic Renderable Volumes from Images", ACM Trans. Graph., vol. 38, No. 4, Article 65, Jul. 2019, pp. 65:1-65:14.
Martin-Brualla et al., "GeLaTO: Generative Latent Textured Objects", arXiv:2008.04852v1, Aug. 11, 2020, 18 pages.
Martin-Brualla et al., "NeRF in the Wild: Neural Radiance Fields for Unconstrained Photo Collections", Conference on Computer Vision and Pattern Recognition, Jun. 19-25, 2021, Nashville, TN, pp. 7210-7219.
Mildenhall et al., "NeRF: Representing Scenes as Neural Radiance Fields for View Synthesis", arXiv:2003.08934v2, Aug. 3, 2020, 25 pages.
Nguyen-Phuoc et al., "HoloGAN: Unsupervised Learning of 3D Representations From Natural Images", International Conference on Computer Vision, Oct. 27-Nov. 2, 2019, Seoul, Korea, pp. 7588-7597.
Niemeyer et al., "GIRAFFE: Representing Scenes as Compositional Generative Neural Feature Fields", Conference on Computer Vision and Pattern Recognition, Jun. 19-25, 2021, Nashville, TN, pp. 11453-11464.
Novotny et al., "Category-Specific Object Reconstruction from a Single Image", International Conference on Computer Vision, Oct. 22-29, 2017, Venice, Italy, pp. 5218-5227.
Park et al., "DeepSDF: Learning Continuous Signed Distance Functions for Shape Representation", Conference on Computer Vision and Pattern Recognition, Jun. 16-20, 2019, Long Beach, CA, pp. 165-174.
Park et al., "Deformable Neural Radiance Fields", arXiv:2011.12948v2, Nov. 26, 2020, 12 pages.
Park et al., "LatentFusion: End-to-End Differentiable Reconstruction and Rendering for Unseen Object Pose Estimation", Conference on Computer Vision and Pattern Recognition Jun. 14-19, 2020, Virtual, pp. 10710-10719.
Ren et al., "Figure/Ground Assignment in Natural Images", European Conference on Computer Vision, May 7-13, 2006, Graz, Austria, pp. 614-627.
Schonberger et al., "Structure-from-Motion Revisited", Conference on Computer Vision and Pattern Recognition, Jun. 26-Jul. 1, 2016, Las Vegas, NV, 10 pages.
Schwarz et al., "GRAF: Generative Radiance Fields for 3D-Aware Image Synthesis", Conference on Neural Information Processing Systems, Dec. 6-12, 2020, Virtual, 13 pages.
Sitzmann et al., "Deep Voxels: Learning Persistent 3D Feature Embeddings", Conference on Computer Vision and Pattern Recognition, Jun. 16-20, 2019, Long Beach, CA, pp. 2437-2446.
Sitzmann et al., "Implicit Neural Representations with Periodic Activation Functions", Conference on Neural Information Processing Systems, Dec. 6-12, 2020, Virtual, 12 pages.
Sitzmann et al., "Scene Representation Networks: Continuous 3D-Structure-Aware Neural Scene Representations", Conference on Neural Information Processing Systems, Dec. 8-14, 2019, Vancouver, Canada, 12 pages.
Stanley, "Compositional Pattern Producing Networks: A Novel Abstraction of Development", Genetic Programming and Evolvable Machines, vol. 8, No. 2, 2007, 36 pages.
Tancik et al., "Fourier Features Let Networks Learn High Frequency Functions in Low Dimensional Domains", Conference on Neural Information Processing Systems, Dec. 6-12, 2020, Virtual, 11 pages.
Tatarchenko et al., "Octree Generating Networks: Efficient Convolutional Architectures for High-resolution 3D Outputs", International Conference on Computer Vision, Oct. 22-29, 2017, Venice, Italy, pp. 2088-2096.
Tewari et al., "State of the Art on Neural Rendering", arXiv:2004.03805v1, Apr. 8, 2020, 27 pages.
Thies et al., "Deferred Neural Rendering: Image Synthesis using Neural Textures", arXiv:1904.12356v1, Apr. 28, 2019, 12 pages.
Vicente et al., "Reconstructing PASCAL VOC", Conference on Computer Vision and Pattern Recognition, Jun. 23-28, 2014, Columbus, OH, 8 pages.
Wang et al., "Normalized Object Coordinate Space for Category—Level 6D Object Pose and Size Estimation", arXiv:1901.02970v2, Jun. 23, 2019, 12 pages.
Wang et al., "Pixel2Mesh: Generating 3D Mesh Models from Single RGB Images", European Conference on Computer Vision, Sep. 8-14, 2018, Munich, Germany, 16 pages.
Wiles et al., "SilNet : Single- and Multi-View Reconstruction by Learning from Silhouettes", arXiv:1711.07888v1, Nov. 21, 2017, 13 pages.
Wu et al., "Unsupervised Learning of Probably Symmetric Deformable 3D Objects from Images in the Wild", Conference on Computer Vision and Pattern Recognition Jun. 14-19, 2020, Virtual, 10 pages.
Ye et al., "Shelf-Supervised Mesh Prediction in the Wild", arXiv:2102.06195v1, Feb. 11, 2021, 11pages.
Yuan et al., "STaR: Self-supervised Tracking and Reconstruction of Rigid Objects in Motion with Neural Rendering", arXiv:2101.01602v1, Dec. 22, 2020, 12 pages.
Zhang et al., "The Unreasonable Effectiveness of Deep Features as a Perceptual Metric", Conference on Computer Vision and Pattern Recognition, Jun. 18-22, 2018, Salt Lake City, UT, pp. 586-595.

(56) References Cited

OTHER PUBLICATIONS

Zhu et al., "Semantic Amodal Segmentation", Conference on Computer Vision and Pattern Recognition Jul. 21-26, 2017, Honolulu, Hawaii, pp. 1464-1472.

* cited by examiner

FIGURE-GROUND NEURAL RADIANCE FIELDS FOR THREE-DIMENSIONAL OBJECT CATEGORY MODELLING

RELATED APPLICATIONS

This application claims priority to and the benefit of U.S. Provisional Patent Application No. 63/270,118, filed Oct. 21, 2021. U.S. Provisional Patent Application No. 63/270,118 is hereby incorporated by reference in its entirety.

FIELD

The present disclosure relates generally to learning three-dimensional object category modeling. More particularly, the present disclosure relates to the use of neural radiance fields to learn high quality three-dimensional object category models from collections of input images.

BACKGROUND

Object category modeling and background separation can be computationally expensive and rely on a large amount of training data, while continuing to output lingering artifacts associated with shadows or other potentially perceived irregularities. Previous systems for object model training often relied on supervised training. Moreover, the output of previous systems may provide for poor resolution outputs due to computational resource restraints.

Three-dimensional category modelling from images may involve supervision in the form of three-dimensional models, segmentations, or semantic key points. Some attempts have been made to learn three-dimensional category models using images alone; however, these methods may involve assuming simple backgrounds or known silhouettes. An open problem may be to learn three-dimensional object category models using casually captured photography with unconstrained backgrounds and minimal supervision.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more processors, an input dataset. The input dataset can include an input position and an input view direction. The method can include processing, by the computing system, the input dataset with a foreground neural radiance field model to generate a foreground output. In some implementations, the foreground output can include a foreground color output and a foreground density output. The method can include processing, by the computing system, the input dataset with a background neural radiance field model to generate a background output. In some implementations, the background output can include a background color output and a background density output. The method can include generating, by the computing system, a rendering based at least in part on the foreground output and the background output.

Another example aspect of the present disclosure is directed to a computing system. The computing system can include one or more processors and one or more non-transitory computer-readable media that collectively store instructions, when executed by the one or more processors, cause the computing system to perform operations. The operations can include obtaining a training dataset. The training dataset can include a plurality of training images, a plurality of respective positions, and a plurality of respective view directions. In some implementations, the plurality of training images can be descriptive of an object of an object category in an environment. The operations can include processing the plurality of respective positions and the plurality of respective view directions with a foreground neural radiance field model to generate a plurality of predicted foreground colors and a plurality of predicted foreground densities. The operations can include processing the plurality of respective positions and the plurality of respective view directions with a background neural radiance field model to generate a plurality of predicted background colors and a plurality of predicted background densities. In some implementations, the operations can include generating one or more predicted renderings based on the plurality of predicted foreground colors, the plurality of predicted foreground densities, the plurality of predicted background colors, and the plurality of predicted background densities. The operations can include evaluating a loss function that evaluates a difference between one or more of the plurality of training images and the one or more predicted renderings and adjusting one or more parameters of at least one of the foreground neural radiance field model or the background neural radiance field model based on the loss function.

Another example aspect of the present disclosure is directed to one or more non-transitory computer-readable media that collectively store instructions that, when executed by one or more computing devices, cause the one or more computing devices to perform operations. The operations can include obtaining a training dataset. The training dataset can include one or more training images, one or more respective positions, and one or more respective view directions. In some implementations, the one or more training images can be descriptive of an object category. The operations can include processing the one or more respective positions and the one or more respective view directions with a foreground neural radiance field model to generate one or more predicted foreground outputs. The one or more predicted foreground outputs can include one or more predicted foreground color distributions and one or more predicted foreground density distributions. The operations can include processing the one or more respective positions and the one or more respective view directions with a background neural radiance field model to generate one or more predicted background outputs. In some implementations, the one or more predicted background outputs can include one or more predicted background color distributions and one or more predicted background density distributions. The operations can include generating one or more predicted object outputs based on the one or more predicted foreground outputs and the one or more predicted background outputs. The operations can include evaluating a loss function that evaluates a difference between the one or more training images and the one or more predicted object outputs and adjusting one or more parameters of at least one of the foreground neural radiance field model or the background neural radiance field model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
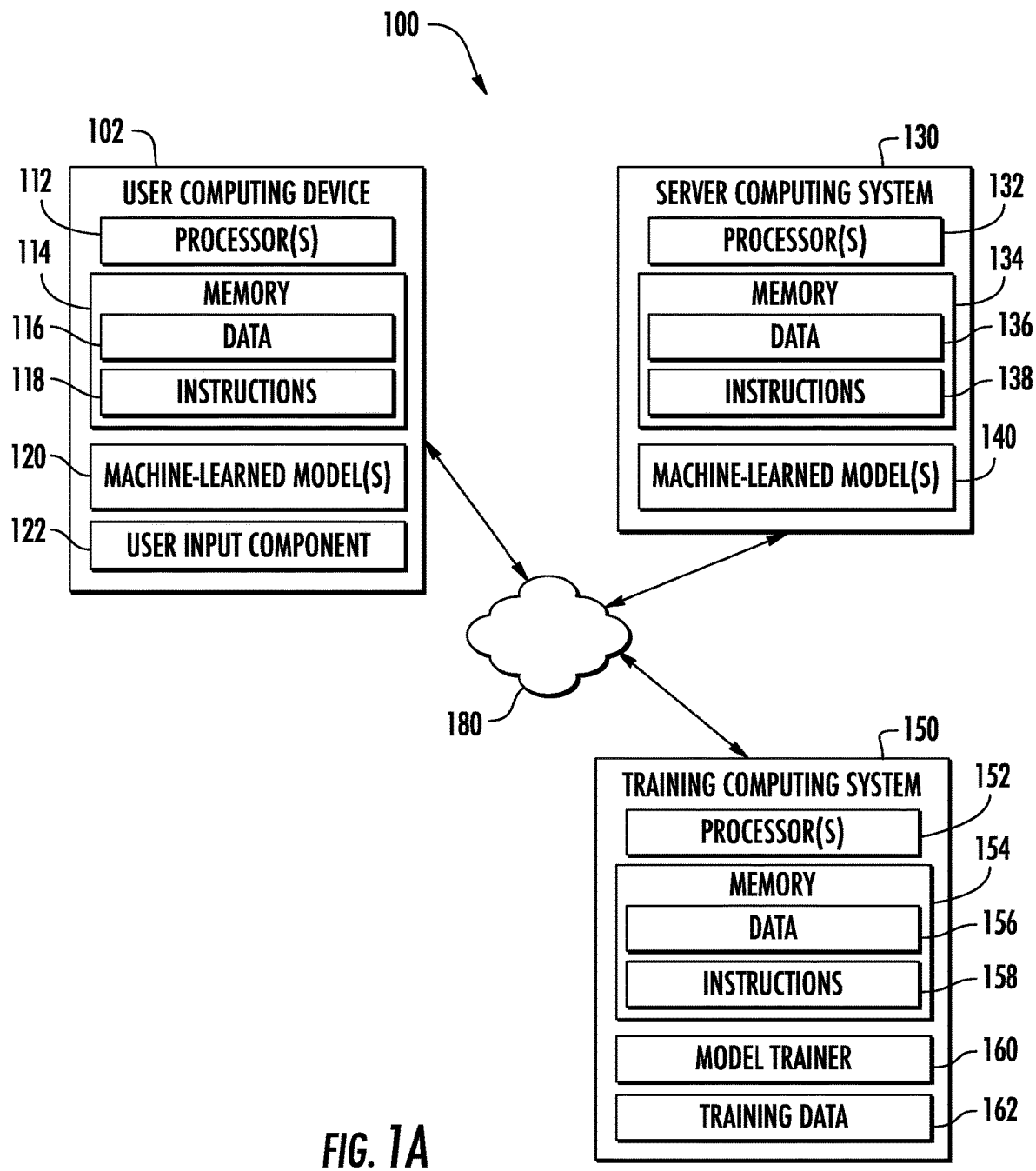
FIG. 1A depicts a block diagram of an example computing system that performs generating an object output with an object category model according to example embodiments of the present disclosure.

Reference numerals that are repeated across plural figures are intended to identify the same features in various implementations.

DETAILED DESCRIPTION

Overview

Generally, the present disclosure is directed to systems and methods for object category modelling. The systems and methods disclosed herein can leverage figure-ground neural radiance fields for object category modelling tasks. For example, the systems and methods disclosed herein can process a plurality of image data sets to train one or more neural radiance field models. The neural radiance field models can then be utilized for one or more object category modelling tasks (e.g., view synthesis rendering, instance interpolation, and/or image segmentation).

The systems and methods for object category modelling tasks (e.g., view synthesis, instance interpolation, or generating segmentations) can include obtaining an input dataset. In some implementations, the input dataset can include an input position and an input view direction. The input dataset can be processed with a foreground neural radiance field model to generate a foreground output. The foreground output can include a foreground color output and a foreground density output. Additionally and/or alternatively, the input dataset can be processed with a background neural radiance field model to generate a background output. In some implementations, the background output can include a background color output and a background density output. An object output (e.g., a view synthesis rendering, an instance interpolation, and/or one or more segmentations) can be generated based at least in part on the foreground output and the background output.

The systems and methods disclosed herein can include obtaining input dataset. The input dataset can include an input position and an input view direction. The input position can be a three-dimensional position in space, and the input view direction can be descriptive of a direction in a three-dimensional observation space. In some implementations, the initial dataset can include one or more embeddings, such as a foreground shape embedding, a foreground appearance embedding, and a background appearance embedding. Alternatively and/or additionally, the embeddings may be learned during the training of one or more of the neural radiance field models.

The input dataset can be processed with a foreground neural radiance field model to generate a foreground output. In some implementations, the foreground output can include a foreground color output and a foreground density output. The foreground color output can include a probability distribution for one or more color values. Additionally and/or alternatively, the foreground density output can include a probability distribution for one or more volume densities. In some implementations, the foreground output can be generated based at least in part on the foreground shape embedding and the foreground appearance embedding.

The foreground neural radiance model can be trained with a training dataset descriptive of an object category. The training dataset can include ground truth image data descriptive of a ground truth image, a three-dimensional position, and a view direction. Additionally and/or alternatively, the training dataset can include background image data descriptive of an environment without an object of the object category. In some implementations, the foreground neural radiance field model can include a deformation field model and a foreground template model. The deformation field model can be configured to warp a first point in observation-space coordinates to a second point in template-space, and the foreground template model can be configured to process position and direction to generate a neural radiance field output comprising a color and a volume density.

In some implementations, processing the input data set with a foreground neural radiance model to generate the foreground output can include: processing the input position and the input view direction with a multi-layer perceptron to map the input position and the input view direction to a red-green-blue color value and a volume density and generating the foreground output based at least in part on the red-green-blue color value and the volume density.

In some implementations, the input dataset can be processed with a background neural radiance field model to generate a background output. The background output can include a background color output and a background density output. The background color output can include a probability distribution for one or more color values. Additionally and/or alternatively, the background density output can include a probability distribution for one or more volume densities. In some implementations, the background output can be generated based at least in part on the background appearance embedding.

The background neural radiance field model can include a background template model. The background template model can be configured to process position data and direction data to generate a neural radiance field output comprising color data and volume density data.

The foreground output and/or the background output can include data descriptive of a color probability distribution and a volume density probability distribution.

In some implementations, the foreground neural radiance field model and the background neural radiance field model may be trained with a photometric loss, a separation regularization, and a deformation regularization.

An object output can be generated based at least in part on the foreground output and the background output. The object output can include a view synthesis rendering, an instance interpolation, and/or an image segmentation. In some implementations, the object output can include an image segmentation descriptive of an object in the foreground of an image. The object output may include an instance interpolation generated based at least in part on the foreground output, the background output, and one or more embeddings. In some implementations, the object output can include a rendering that includes an object in an environment. Generating the rendering can include fixing a geometry of a background embedding before concatenating the foreground output and the background output.

The systems and methods for training object category models can include obtaining a training dataset. In some implementations, the training dataset can include a plurality of training images, a plurality of respective positions, and a plurality of respective view directions. The plurality of training images can be descriptive of an object of an object category in an environment. The plurality of respective positions and the plurality of respective view directions can be processed with a foreground neural radiance field model to generate a foreground output. The foreground output can include a plurality of predicted foreground colors and a plurality of predicted foreground densities. Additionally and/or alternatively, the plurality of respective positions and the plurality of respective view directions can be processed with a background neural radiance field model to generate a background output. The background output can include a plurality of predicted background colors and a plurality of predicted background densities. One or more predicted renderings can then be generated based on foreground output (e.g., the plurality of predicted foreground colors and the plurality of predicted foreground densities) and the background output (e.g., the plurality of predicted background colors and the plurality of predicted background densities). The systems and methods can include evaluating a loss function that evaluates a difference between one or more of the plurality of training images and the one or more predicted renderings. One or more parameters of the foreground neural radiance field model and/or the background neural radiance field model can then be adjusted based on the loss function.

Training one or more object category models can include obtaining a training dataset. In some implementations, the training dataset can include one or more training images, one or more respective positions, and one or more respective view directions. The one or more training images can be descriptive of an object category. In some implementations, the one or more training images can include ground truth red-green-blue values.

The one or more respective positions and the one or more respective view directions can be processed with a foreground neural radiance field model to generate a foreground output. The foreground output can include one or more predicted foreground colors and one or more predicted foreground densities. In some implementations, the one or more predicted foreground outputs can include one or more predicted foreground color distributions and one or more predicted foreground density distributions.

In some implementations, the one or more respective positions and the one or more respective view directions can be processed with a background neural radiance field model to generate a background output. The background output can include one or more predicted background colors and one or more predicted background densities. In some implementations, the one or more predicted background outputs can include one or more predicted background color distributions and one or more predicted background density distributions.

In some implementations, the foreground output can be a predicted foreground output, and the background output can be a predicted background output. Additionally and/or alternatively, the foreground output can include one or more predicted foreground colors and one or more predicted foreground densities, and the background output can include one or more predicted background colors and one or more predicted background densities.

One or more object outputs (e.g., one or more view synthesis renderings, one or more instance interpolations, and one or more segmentation outputs) can then be generated based on foreground output and the background output.

The systems and methods can include evaluating a loss function that evaluates a difference between the one or more training images and the one or more object outputs (e.g., a predicted rendering). The loss function may include a photometric loss.

One or more parameters of the foreground neural radiance field model and/or the background neural radiance field model can then be adjusted based on the loss function.

In some implementations, the systems and methods can include receiving an object output request and generating an object output based on the object output request using the foreground neural radiance field model and the background neural radiance field model. The object output can include at least one of an instance interpolation output, a view synthesis output, or a segmentation output.

Alternatively and/or additionally, the systems and methods can include modifying one or more embedding values based at least in part on the one or more predicted renderings.

The systems and methods may include receiving latent encoding data and an output request and generating an object interpolation with the foreground neural radiance field model based at least in part on the latent encoding data and the output request.

Alternatively and/or additionally, the systems and methods can include obtaining one or more input images. The one or more input images can include an input object of the object category and an input environment. The systems and methods may include processing the one or more input images with the foreground neural radiance field model and the background neural radiance field model to generate a segmentation output and providing the segmentation output for display. In some implementations, the segmentation output can include the input object without the input environment.

The systems and methods disclosed herein can include obtaining a plurality of image data sets descriptive of an environment. In some implementations, the environment can include an object and a background. Additionally and/or alternatively, the object can be in a foreground of the environment. Each image data set of the plurality of image data sets may include image data descriptive of an image, a three-dimensional position, and a view direction. In some implementations, the image data sets may include a plurality of images and a plurality of respective positions. In some implementations, one or more image data set of the plurality of image data sets can include background image data descriptive of the environment without the object.

In some implementations, the systems and methods can include processing the plurality of image data sets with a foreground model to generate a foreground output descriptive of one or more probability distributions. The foreground model may include one or more multi-layer perceptrons. Additionally and/or alternatively, the foreground model can include a deformation field model and a foreground neural radiance field model. The deformation model can be configured to warp a first point in observation-space coordinates to a second point in template-space. Moreover, the foreground neural radiance field model may be configured to process position data and view direction data to generate neural radiance field data (e.g., a five-dimensional function, which can include three-dimensional coordinates, a color value, and a volume density).

In some implementations, processing the plurality of image data sets with a foreground model to generate the foreground output can include processing a three-dimensional position and a two-dimensional viewing direction for each image data set of the plurality of image data sets with a multi-layer perceptron to map the three-dimensional position and the two-dimensional viewing direction of the image data set to a red-green-blue color value and a volume density and generating the foreground output based at least in part on the red-green-blue color value and the volume density.

The systems and methods can include processing the plurality of image data sets with a background model to generate a background output descriptive of one or more probability distributions. In some implementations, the background model can include a background neural radiance field model, and the background neural radiance field model can be configured to process position data and view direction data to generate a neural radiance field data.

Additionally and/or alternatively, the foreground model and the background model can be trained with a photometric loss, a separation regularization, and a deformation regularization. In some implementations, the foreground output and/or the background output can include data descriptive of a plurality of three-dimensional points (and/or vectors) in a space and a plurality of color values for the respective plurality of three-dimensional points/vectors.

The foreground output and the background output can be used to generate an object output. The object output may include an instance interpolation, a view synthesis, or an object segmentation. For example, the systems and methods can include generating a rendering (e.g., a new view rendering) based at least in part on the foreground output and the background output. In some implementations, the object output can include an object classification, an object category, and/or a trained object category model. The trained object category model can be utilized for knowledge distillation and/or for one or more object category modeling tasks. In some implementations, the trained object category model can be utilized to generate a database of neural radiance field data, a database of view synthesis renderings, and/or a database of augmented objects. Additionally and/or alternatively, generating the rendering may include fixing the geometry of the background before processing the input and concatenating the foreground output and the background output.

The systems and methods can include determining an object classification for the object based on the rendering. For example, the systems and methods can include one or more image analysis techniques for leveraging pre-existing or taught object recognition processes to provide a classification for the object category being modeled. Moreover, in some implementations, the systems and methods can include determining an object category based at least in part on the plurality of image data sets.

In some implementations, the systems and methods can include generating a segmented three-dimensional object representation based at least in part on the foreground output and the background output. The representation can then be utilized to generate an augmented-reality rendering asset or may be utilized for a virtual-reality experience or may be utilized for media generation (e.g., for generating a three-dimensional object in a video game, a movie, or another visual media medium).

In some implementations, the systems and methods can include an encoder model (e.g., a generative embedding model configured to generate one or more embeddings) and a neural radiance field model. The systems and method can leverage the latent encoding data output of the encoder model to output a more appearance aware output with the neural radiance field model. For example, the systems and methods can include obtaining a plurality of image data sets. The plurality of image data sets can be descriptive of an environment, and the environment may include an object.

The plurality of image data sets can be utilized to train an encoder model to generate latent encoding data. In some implementations, the latent encoding data can include background latent encoding data and foreground latent encoding data.

The latent encoding data and the plurality of image data sets can then be utilized to train a neural radiance field model to generate an output descriptive of a color distribution and a volume density distribution. In some implementations, the neural radiance field model can include one or more multi-layer perceptrons.

An object output can then be generated based on the neural radiance field output. In some implementations, the object output can include an instance interpolation output, a view synthesis output, or a segmentation output.

Additionally and/or alternatively, the systems and methods can include obtaining a ground truth object output (e.g., novel view synthesis, instance interpolation, augmented renderings, and/or a segmentations (e.g., scene segmentations, background segmentation, or object segmentation)). The ground truth object output can include ground truth red-green-blue values, and the loss function can include a photometric loss. Moreover, the systems and methods can include evaluating a loss function that evaluates a difference between the ground truth object output and the object output and adjusting one or more parameters of the encoder model or the neural radiance field model.

The systems and methods of the present disclosure provide a number of technical effects and benefits. As one example, the system and methods can train an object category model for a variety of tasks on a variety of objects. More specifically, the systems and methods can utilize neural radiance fields for unsupervised learning. For example, in some implementations, the systems and methods can include one or more conditional neural radiance field models that can obtain latent encoding data and one or more input images to train an object category model to generate instance interpolations, view synthesis, and/or object segmentation.

Another technical benefit of the systems and methods of the present disclosure is the ability to train the object category model without supervision. For example, the training can occur without user-generated labels or input. In some implementations, the object category model can derive background constants based on a plurality of images associated with an object. The systems and methods disclosed herein can use neural radiance fields to derive environment data for view synthesis, instance interpolation, and/or object segmentation.

Another example technical effect and benefit relates to improved computational efficiency and improvements in the functioning of a computing system. For example, the systems and methods disclosed herein can leverage neural radiance field data in place of large voxel array data which can reduce the memory cost of producing high quality outputs. Moreover, the systems and methods disclosed herein can be applicable to objects depicted in a variety of diverse backgrounds with geometry-aware results in novel view synthesis, segmentation, and interpolation.

With reference now to the Figures, example embodiments of the present disclosure will be discussed in further detail.

Example Devices and Systems

FIG. 1A depicts a block diagram of an example computing system 100 that performs object category modeling according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more object category models 120. For example, the object category models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

The object category models 120 can include a foreground model and a background model. In some implementations, the object category model 120 can include an encoder model and one or more neural radiance field models. Example object category models 120 are discussed with reference to FIGS. 2 & 4.

In some implementations, the one or more object category models 120 can be received from the server computing system 130 over network 180, stored in the user computing device memory 114, and then used or otherwise implemented by the one or more processors 112. In some implementations, the user computing device 102 can implement multiple parallel instances of a single object category model 120 (e.g., to perform parallel three-dimensional object category modelling across multiple instances of objects).

More particularly, the systems and methods can obtain one or more positions and one or more view directions. The one or more positions and the one or more view directions can then be processed with an object category model to generate an object output. The object output can include an instance interpolation, a view synthesis, and/or a segmentation output. The object category model may include a foreground model and a background model. The foreground model may include a deformation model and a neural radiance field template model. In some implementations, the background model can include a neural radiance field template model. Additionally and/or alternatively, the foreground model and/or the background model may process latent encoding data to reinforce object appearance and shape. In some implementations, the latent encoding data may be learned during training of the one or more machine-learned models. Alternatively and/or additionally, the latent encoding data may be generated with an encoder model that processes one or more images associated with a scene.

Additionally or alternatively, one or more object category models 140 can be included in or otherwise stored and implemented by the server computing system 130 that communicates with the user computing device 102 according to a client-server relationship. For example, the object category models 140 can be implemented by the server computing system 140 as a portion of a web service (e.g., an object category modelling service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned object category models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 & 4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the object category models 120 and/or 140 based on a set of training data 162. The training data 162 can include, for example, a plurality of images of an object of a particular category. In some implementations, the training data 162 can include ground truth data (e.g., ground truth color values and volume densities, ground truth interpolation, ground truth view synthesis, ground truth object segmentation, and/or a ground truth classification).

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). In another example, the input includes visual data (e.g., one or more images or videos), the output comprises compressed visual data, and the task is a visual data compression task. In another example, the task may comprise generating an embedding for input data.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be cups, glasses, dogs, cats, cars, etc. As another example, the set of categories can be associated with a foreground category (e.g., a human in the foreground or a cup) or a background category (e.g., a table background or a mannequin head). As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
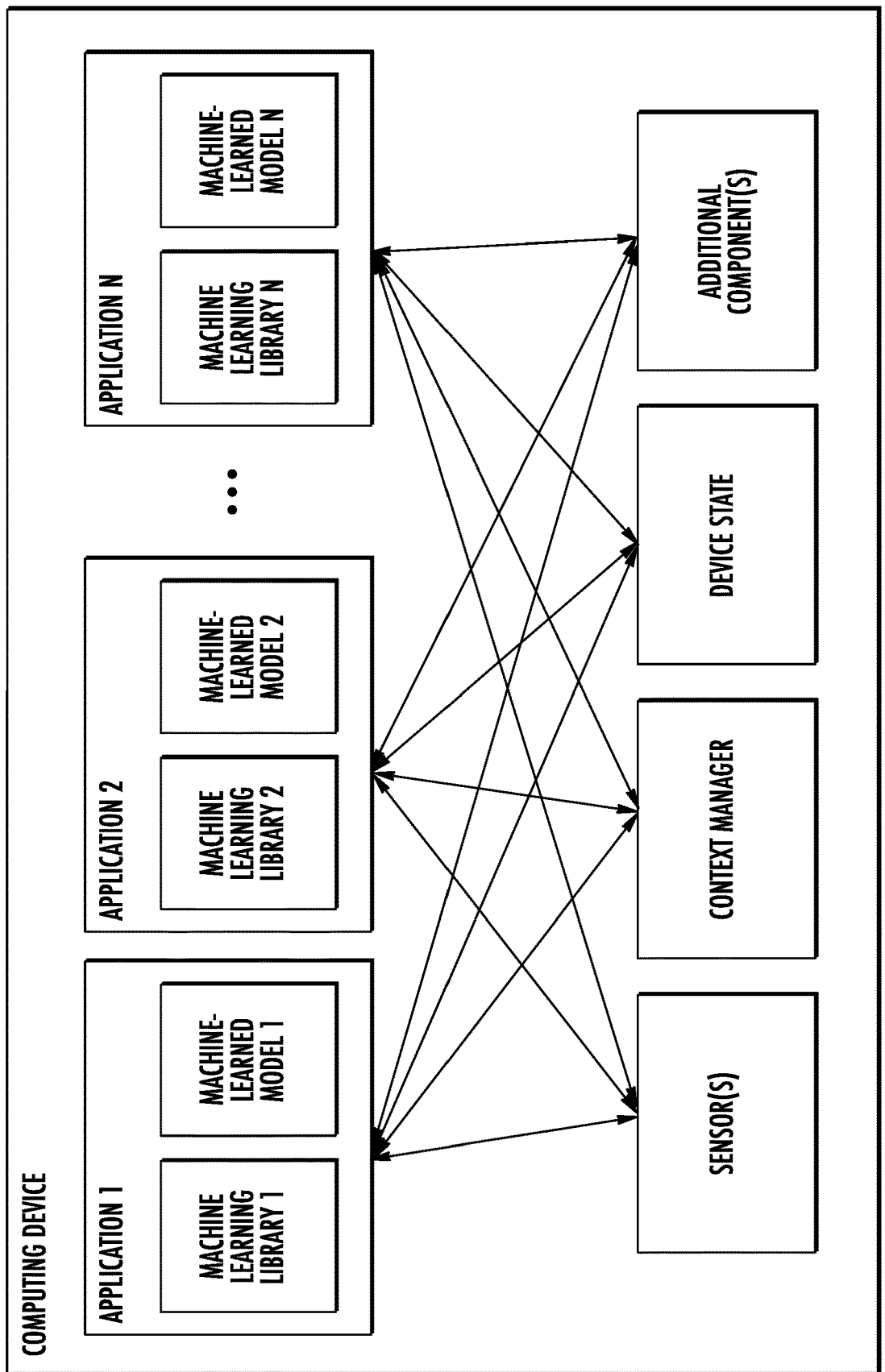
FIG. 1B depicts a block diagram of an example computing device that performs generating an object output with an object category model according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
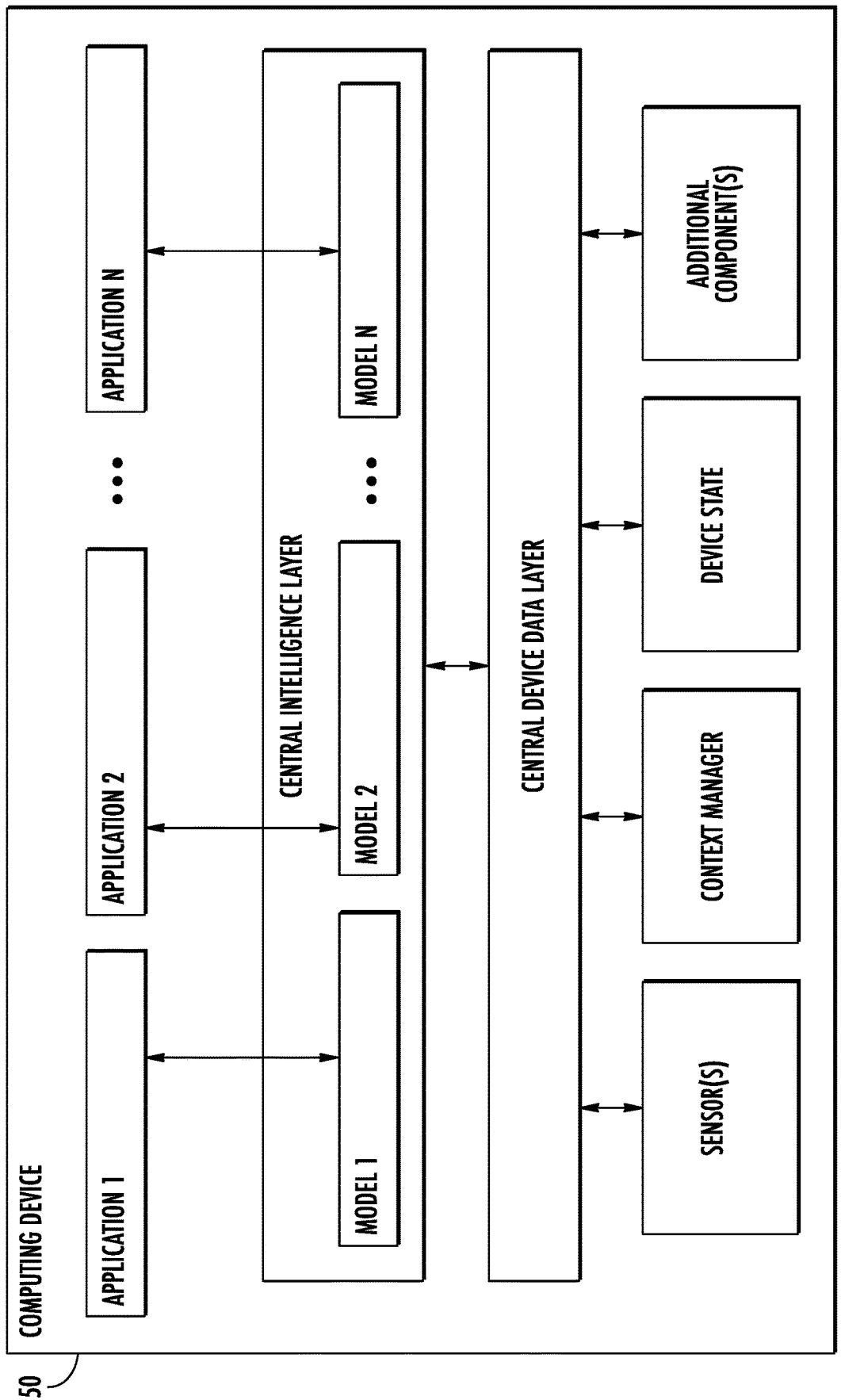
FIG. 1C depicts a block diagram of an example computing device that performs generating an object output with an object category model according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
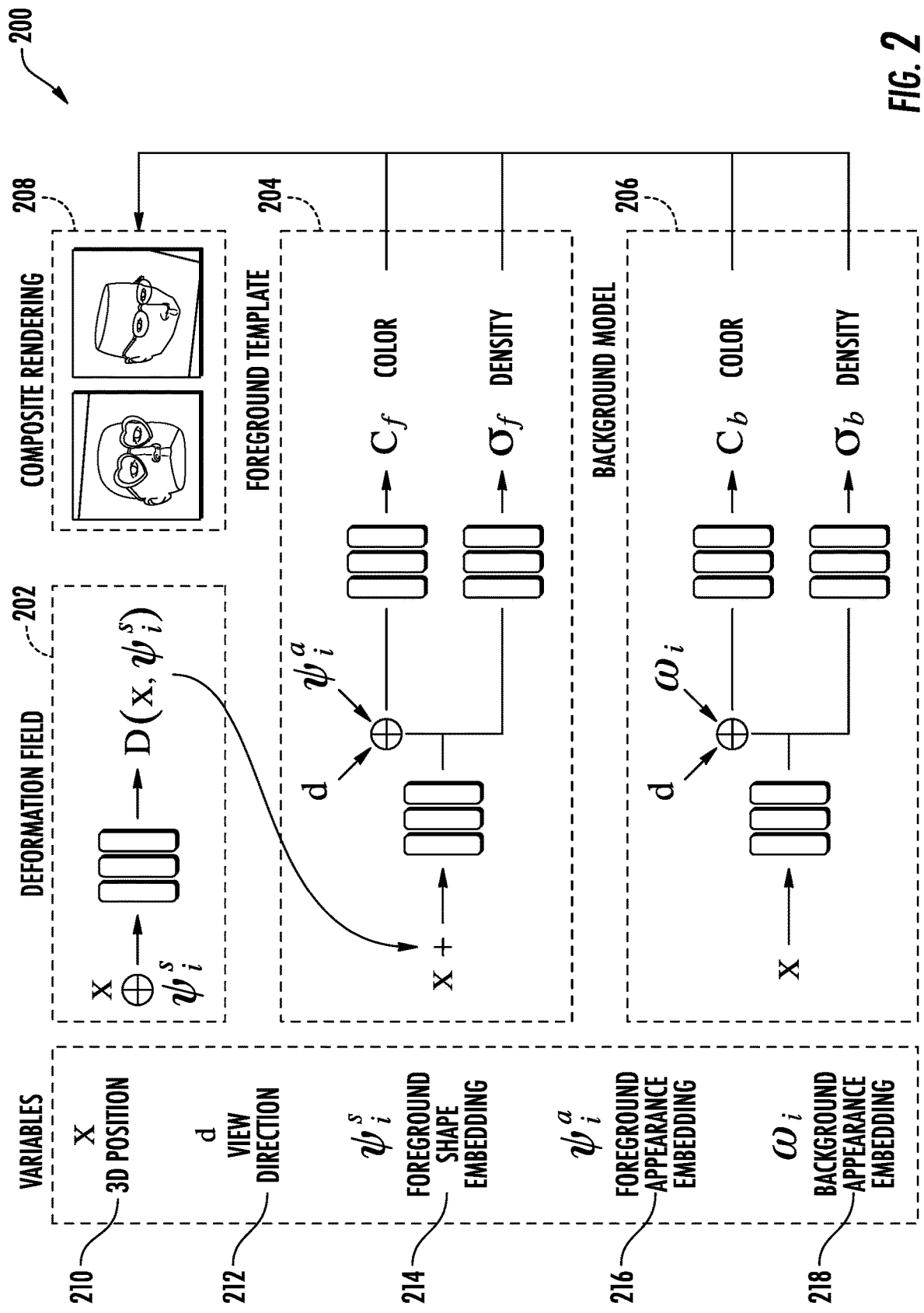
FIG. 2 depicts a block diagram of an example object category model according to example embodiments of the present disclosure.

FIG. 2 depicts a block diagram of an example object category model 200 according to example embodiments of the present disclosure. In some implementations, the object category model 200 is trained to receive a set of input data 210 descriptive of a three-dimensional position and, as a result of receipt of the input data 210, provide output data 208 that is descriptive of a composite rendering. Thus, in some implementations, the object category model 200 can include a foreground model 204 (e.g., a foreground neural radiance field model) that is operable to output foreground data based at least in part on the output of a deformation field model 202. The foreground data can include a foreground output (e.g., neural radiance field data, which can include or be based on a five-dimensional function), which can include density data and color data. In some implementations, the object category model 200 can include a background model 206 (e.g., a background neural radiance field model) that is operable to output background data (e.g., neural radiance field data).

More specifically, the systems and methods can include a FiG-NeRF architecture including foreground and background models as depicted in FIG. 2. The foreground model can include the deformation field 202 and template NeRF 204, and the background model 206 can include a template NeRF. In some implementations, the deformation field 202 can process a concatenation of the three-dimensional position 210 and the foreground shape embedding 214. Additionally and/or alternatively, the output of the deformation field 202 and the three-dimensional position 210 can be processed by the foreground template 204 to output color data and density data. In some implementations, the foreground template 204 can involve a plurality of multi-layer perceptrons and a concatenation of a view direction 212 and a foreground appearance embedding 216.

The background model 206 including the template NeRF can process the position 210 with a plurality of multi-layer perceptrons and may include a concatenation of the view direction 212 and the background appearance embedding 218. The output of the background model 206 can include color data and density data.

The foreground color data, the foreground density data, the background color data, and the background density data can then be utilized to generate composite rendering 208. The composite rendering 208 can include view synthesis of a new view of the object. Alternatively and/or additionally, the composite rendering 208 can include an instance interpolation of a new object of the same category in an environment. Moreover, in some implementations, the composite rendering 208 can include a representation of the object segmented from the background.

In some implementations, the output of the foreground template NeRF 204 can include a color value probability distribution and a volume density probability distribution, and the output of the background model 206 can include a color value probability distribution and a volume density probability distribution. The two neural radiance field outputs can be utilized for object segmentation and for generating novel views including novel rendering angles and/or renderings of new objects in the same or similar category.

Figure 3:
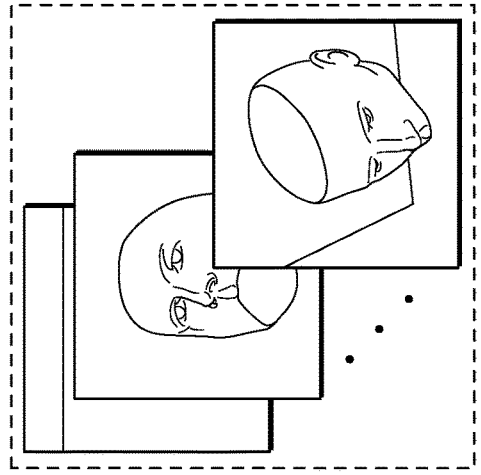
FIG. 3 depicts a block diagram of an example training dataset according to example embodiments of the present disclosure.
Figure 3:
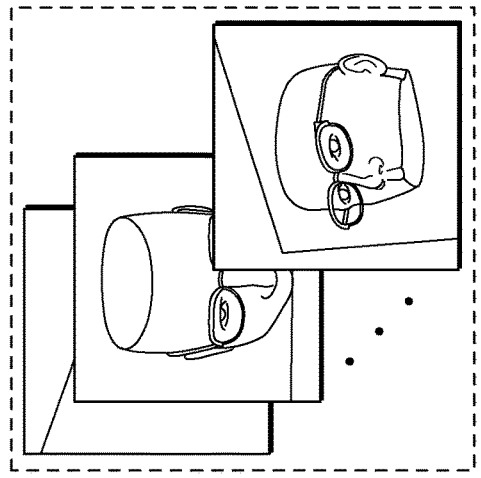
Figure 3:
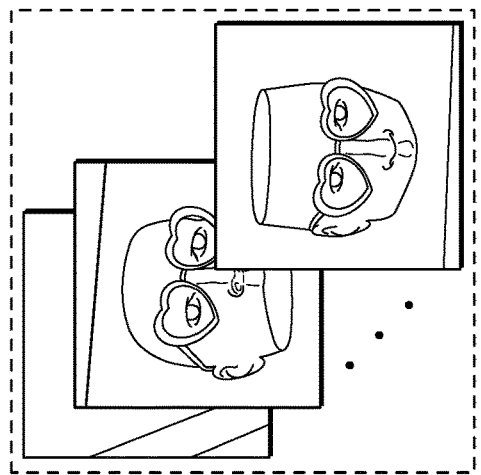
Figure 3:
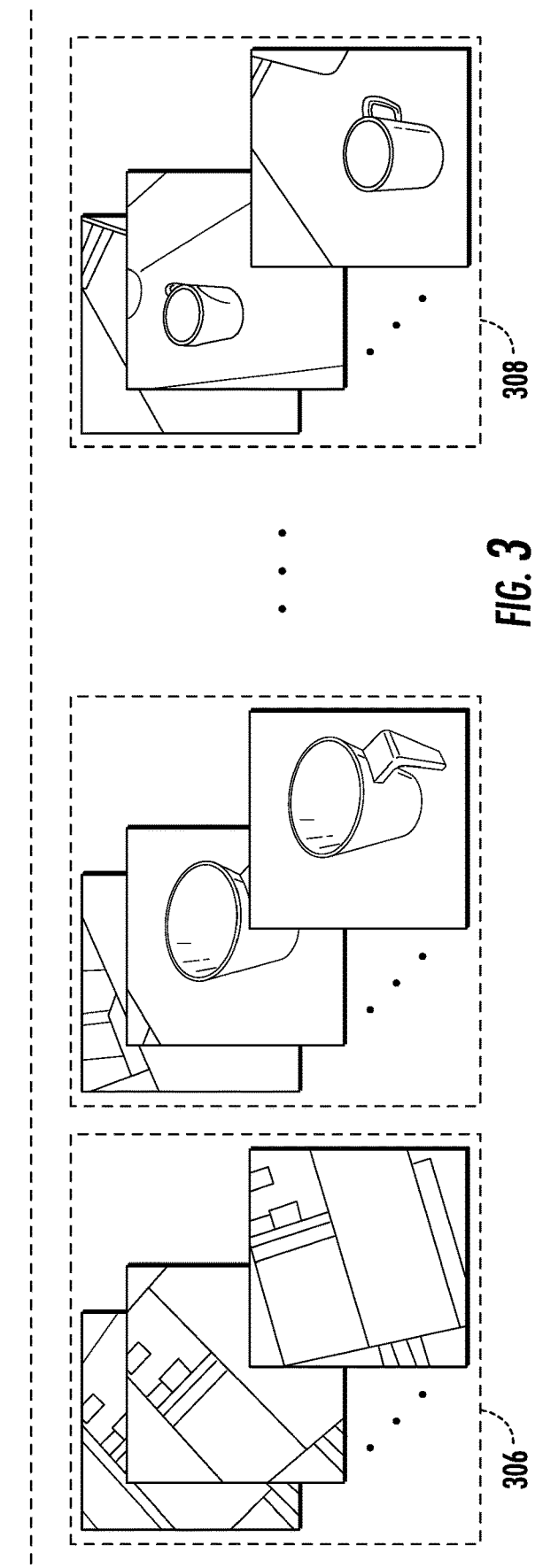

FIG. 3 depicts a block diagram of an example training dataset 300 according to example embodiments of the present disclosure. The training dataset 300 can be utilized to train the object category model 200 of FIG. 2. For example, the background scenes 302 & 306 can be utilized to provide a ground truth image of background data without a foreground object being depicted. The scenes with the object instances 304 & 308 can then be utilized to train the object category model to recognize and classify the object category. The training can involve training the model to render different instances of objects in the object category and/or may involve training the object category model to generate novel view renderings of an object in the object category.

In particular, background scene 302 depicts a mannequin head to depict an example background for the glasses category, while background scene 306 depicts a table to depict an example background for the cup category. Moreover, scenes with object instances 304 depict various glasses on mannequin heads, while scenes with object instances 308 depict various cups on various tables.

More specifically, example setups for GLASSES (top) and CUPS (bottom) datasets are depicted in FIG. 3. For the lab-captured GLASSES dataset, the background (left) is a mannequin, and each scene (right) is a different pair of glasses placed on the mannequin. For CUPS, the systems and methods can train an object category model with an Objectron dataset of crowdsourced casual cellphone video captures, where the dataset captures a planar surface with textures (colored papers) for the background.

Figure 4:
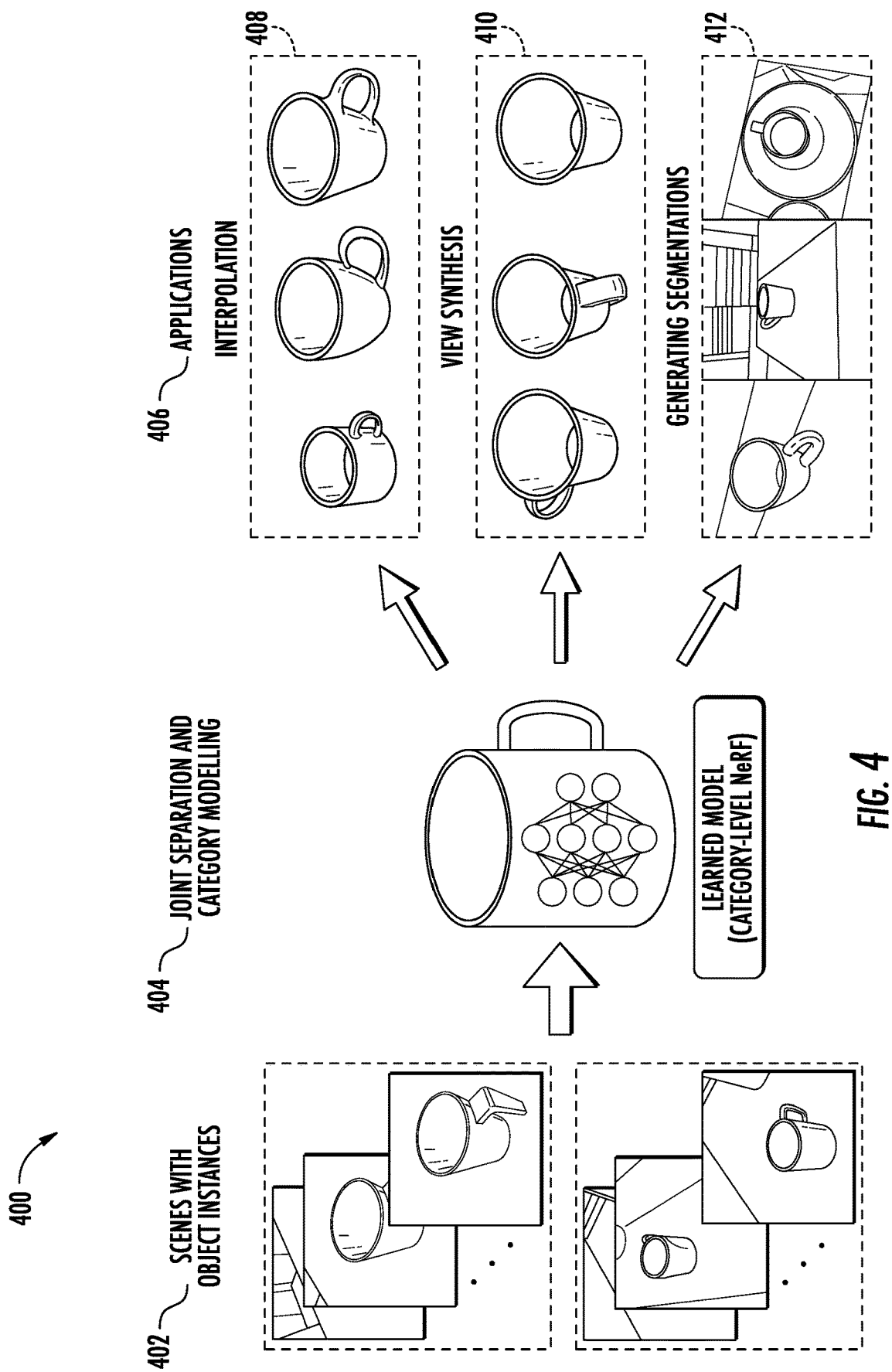
FIG. 4 depicts a block diagram of an example object category model according to example embodiments of the present disclosure.

An overview of an example system 400 is depicted in FIG. 4. The systems and methods can obtain a collection of RGB captures of scenes with objects of a category 402 as input. For example, the systems and methods can include jointly learning to decompose the scenes into foreground and background (without supervision). Moreover, the systems and methods can include a three-dimensional object category model 404, that enables applications 406 such as instance interpolation 408, view synthesis 410, and segmentation 412.

More specifically, FIG. 4 depicts an example object category model 404 with example training inputs 402 and example outputs 406 of a trained object category model. The inputs 402 can include scenes with object instances. The depicted inputs 402 include a plurality of various cups with a plurality of varying backgrounds. The plurality of image data sets can include different viewpoints and different positions. In some implementations, the image datasets can include images, three-dimensional positions, and view directions. Additionally and/or alternatively, the image data sets can include latent encoding data. In some implementations, the latent encoding data can be generated by an encoder model. The encoder model can be part of the object category model 404 or can be a separate model all together.

In some implementations, the object category model 404 (e.g., a learned category-level NeRF model) can be trained for joint separation and category modeling. The object category model 404 may be trained to generate an object output 406 for various applications or tasks. The object output 406 can include an instance interpolation 408, a view synthesis 410, or a segmentation output 412. Instance interpolation 406 can involve generating new objects of the object category including objects of new sizes and colors. View synthesis 410 can involve the rendering of novel views of an object (e.g., new viewing angles). Segmentation outputs 412 can involve the object segmented from an environment.

Figure 5:
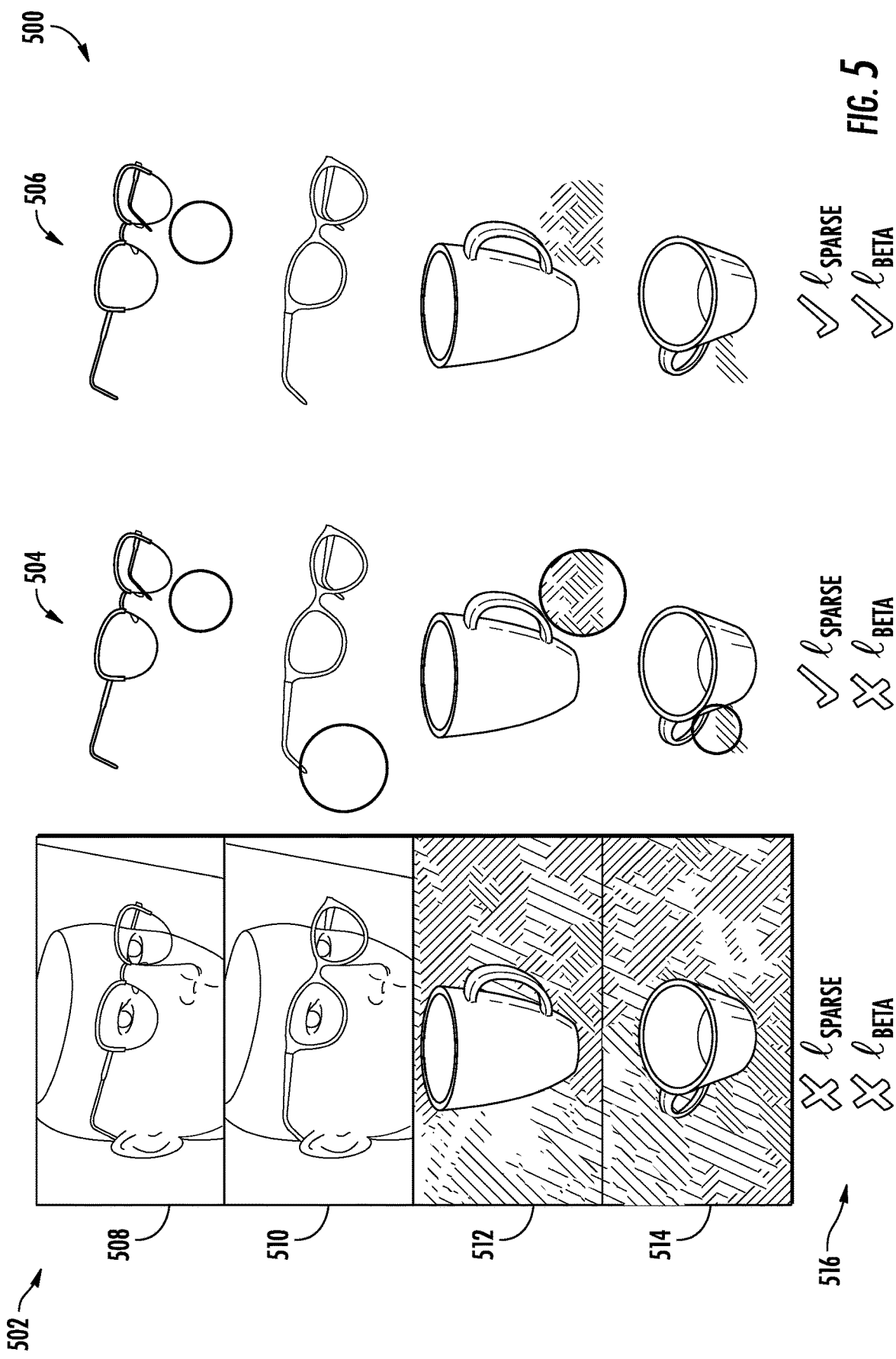
FIG. 5 depicts a block diagram of example lingering artifacts according to example embodiments of the present disclosure.

FIG. 5 depicts example results 500 of systems and methods for object category modelling. The left column 502 includes example image datasets without the use of separation regularization or a beta prior loss function when training. The middle column 504 includes example image datasets utilizing a separation regularization without a beta prior loss function. The right column 506 includes example image datasets utilizing a separation regularization and a beta prior loss function. As depicted in FIG. 5, the use of separation regularization and a beta loss function can provide improved object outputs after training.

For example, example 508 depicts different outputs with wire rimmed glasses as the object. Example 510 depicts different outputs with thicker rimmed glasses as the object. Example 512 depicts different outputs with a tall ceramic coffee mug as the object. Moreover, example 514 depicts different outputs with a short teacup as the object. FIG. 5 further provides a key 516 indicating the columns of results utilizing separation regularization and the beta prior loss function.

Therefore, a separation regularization can enable the separation of a foreground object from a background. Moreover, the beta prior loss function can enable the training of object output generation with mitigated or minimized artifacts.

Foreground renderings of ablated models are depicted in FIG. 5. Without $\ell_{sparse}$ (left), the model may fail to separate the background from the foreground. Lingering artifacts, such as faint halos around mannequin silhouette (middle, circled in red), can be further suppressed with $\ell_{beta}$ (right).

Example Methods

Figure 6:
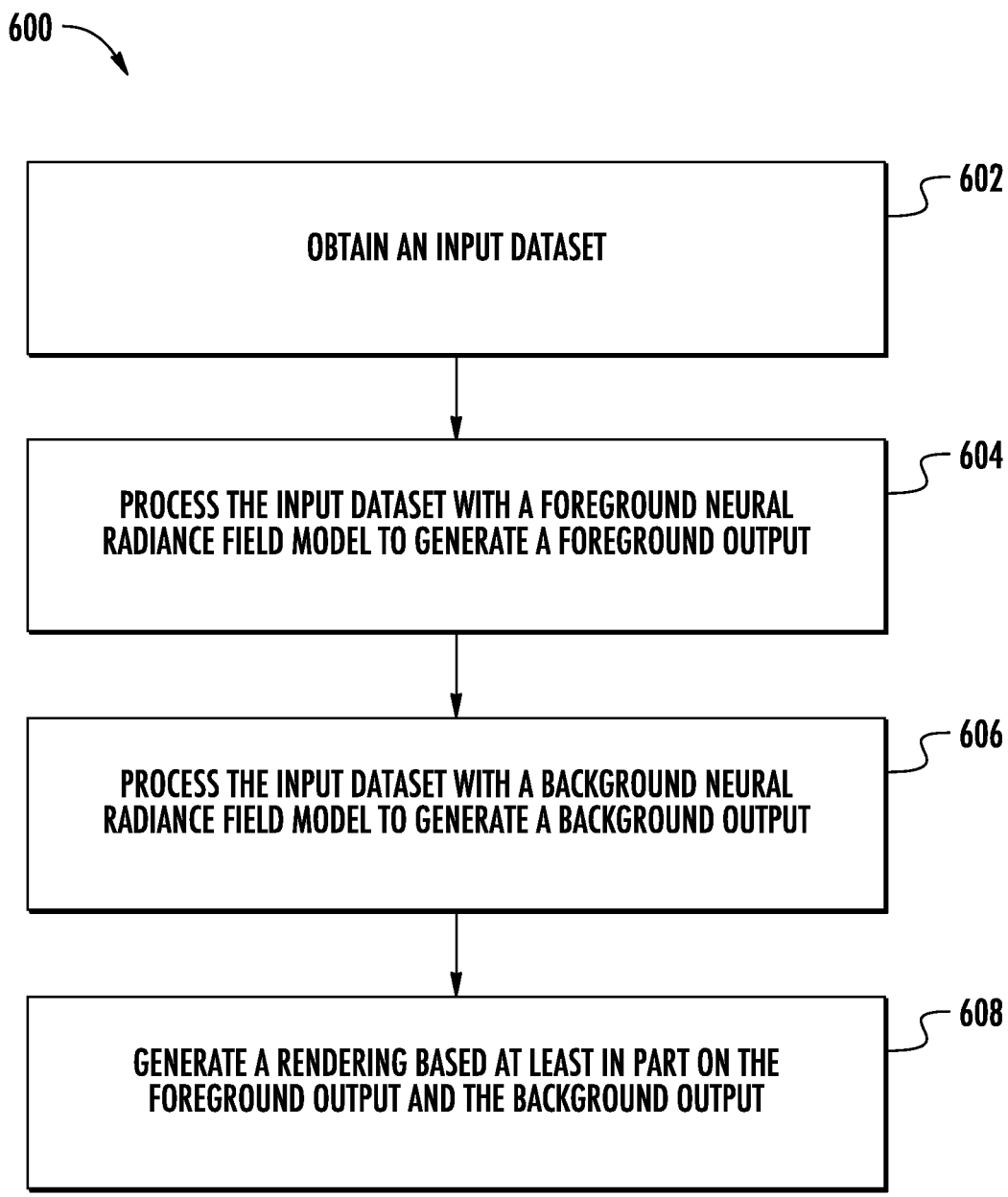
FIG. 6 depicts a flow chart diagram of an example method to perform view rendering according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain an input dataset. The input dataset can include an input position and an input view direction. In some implementations, the input dataset can include one or more embeddings (e.g., a foreground shape embedding, a foreground appearance embedding, and a background appearance embedding).

At 604, the computing system can process the input dataset with a foreground neural radiance field model to generate a foreground output. The foreground output can include a foreground color output (e.g., a color probability distribution) and a foreground density output (e.g., a volume density probability distribution). In some implementations, the foreground neural radiance field model can include one or more multi-layer perceptrons. The foreground neural radiance field model can include a deformation model and a neural radiance field template model. The deformation model may be configured to warp a first point in observation-space coordinates to a second point in template-space. In some implementations, the foreground neural radiance field model may be configured to process position data and view direction data to generate a neural radiance field representation.

In some implementations, processing the plurality of image data sets with a foreground neural radiance field model to generate the foreground output can include processing a three-dimensional position and a two-dimensional viewing direction with a multi-layer perceptron to map the three-dimensional position and the two-dimensional viewing direction to a red-green-blue color value and a volume density and generating the foreground output based at least in part on the red-green-blue color value and the volume density.

At 606, the computing system can process the input dataset with a background neural radiance field model to generate a background output. The background input can include a background color output (e.g., a color probability distribution) and a background density output (e.g., a volume density probability distribution). In some implementations, the background neural radiance field model can include a neural radiance field template model configured to process image data to generate neural radiance field data.

Additionally and/or alternatively, the foreground output and/or the background output can include data descriptive of a plurality of three-dimensional points in a space and a plurality of color values for the respective plurality of three-dimensional points. In some implementations, the foreground neural radiance model and the background neural radiance field model can be trained with a training dataset descriptive of an object category. The training dataset can include ground truth image data descriptive of a ground truth image, a three-dimensional position, and a view direction.

At 608, the computing system can generate a rendering based at least in part on the foreground output and the background output. The rendering can depict an object of a particular object category model in an environment. In some implementations, generating the rendering can include fixing the geometry of the background output before concatenating the foreground output and the background output.

In some implementations, the foreground neural radiance field model and/or the background neural radiance field model may be trained with a photometric loss, a separation regularization, and a deformation regularization.

Figure 7:
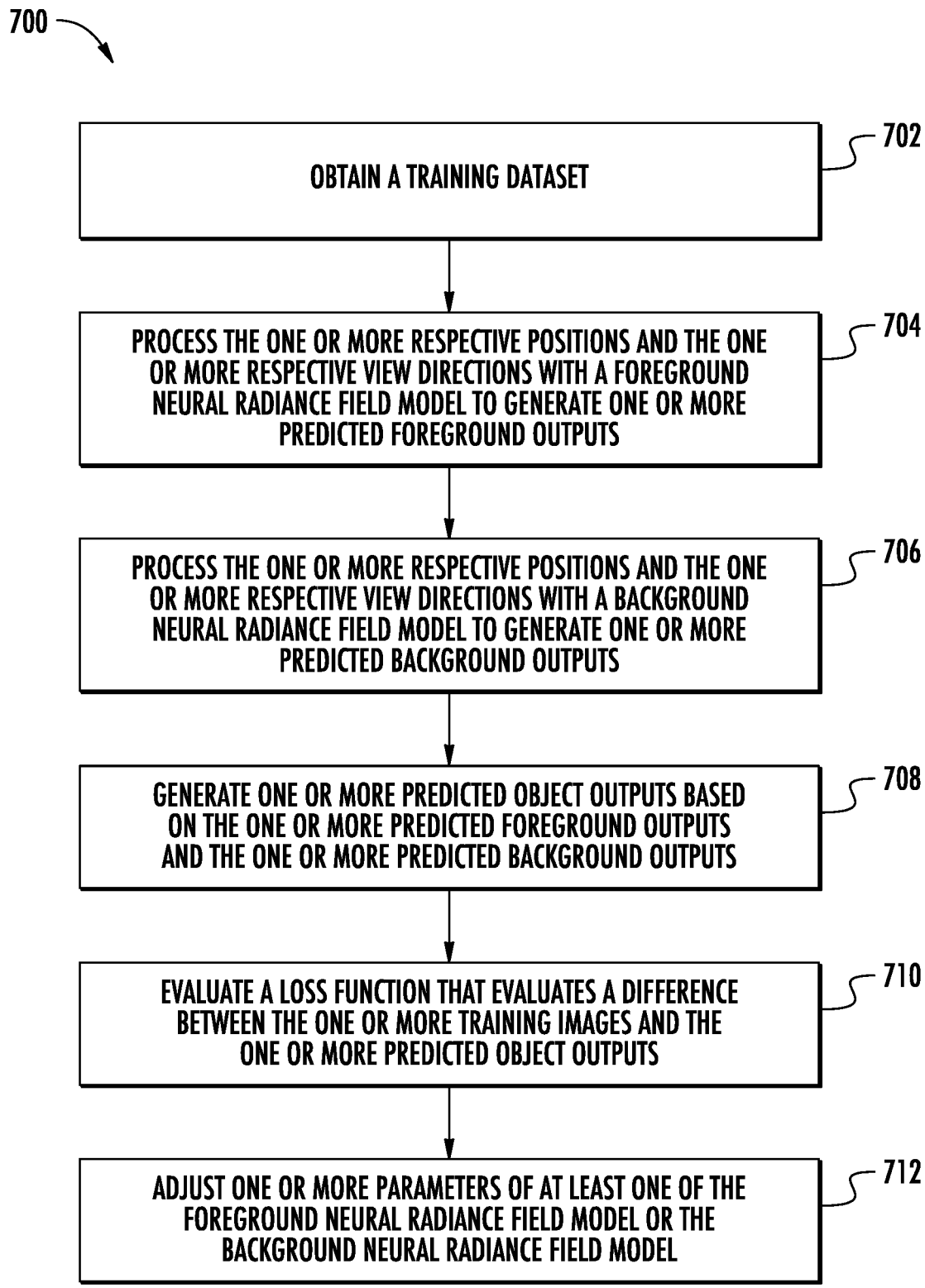
FIG. 7 depicts a flow chart diagram of an example method to perform object output generation with an object category model according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a training dataset. The training dataset can include one or more training images, one or more respective positions, and one or more respective view directions. In some implementations, the one or more training images can be descriptive of an object category.

At 704, the computing system can process the one or more respective positions and the one or more respective view directions with a foreground neural radiance field model to generate one or more predicted foreground outputs. The one or more predicted foreground outputs can include one or more predicted foreground color distributions and one or more predicted foreground density distributions.

At 706, the computing system can process the one or more respective positions and the one or more respective view directions with a background neural radiance field model to generate one or more predicted background outputs. The one or more predicted background outputs can include one or more predicted background color distributions and one or more predicted background density distributions.

At 708, the computing system can generate one or more predicted object outputs based on the one or more predicted foreground outputs and the one or more predicted background outputs.

At 710, the computing system can evaluate a loss function that evaluates a difference between the one or more training images and the one or more predicted object outputs.

At 712, the computing system can adjust one or more parameters of at least one of the foreground neural radiance field model or the background neural radiance field model.

In some implementations, the computing system can receive latent encoding data and an output request and generate an object interpolation with the foreground neural radiance field model based at least in part on the latent encoding data and the output request.

Alternatively and/or additionally, the computing system can obtain one or more input images. The one or more input images can include an input object of the object category and an input environment. The computing system can process the one or more input images with the foreground neural radiance field model and the background neural radiance field model to generate a segmentation output and provide the segmentation output for display. In some implementations, the segmentation output can include the input object without the input environment.

Figure 8:
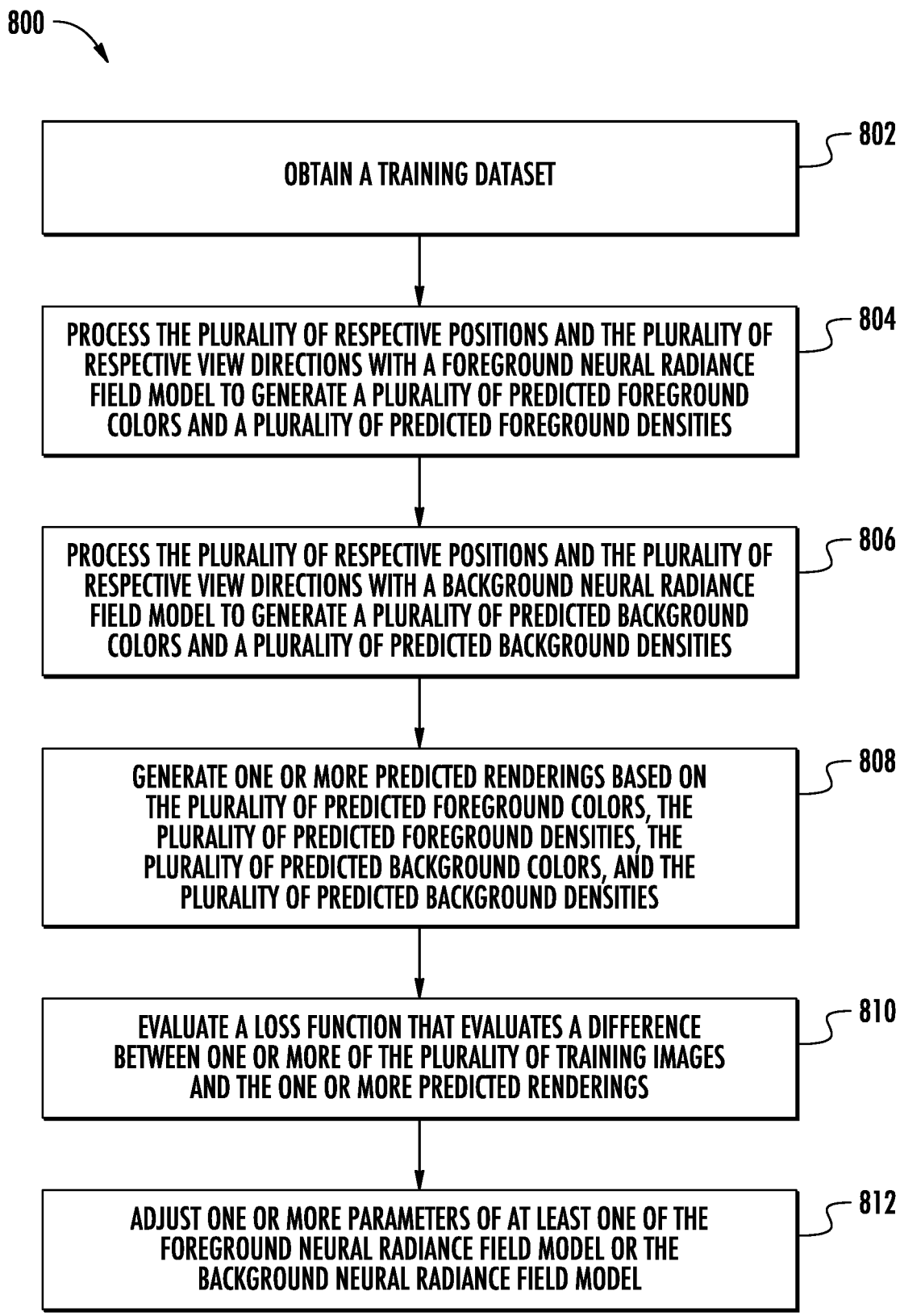
FIG. 8 depicts a flow chart diagram of an example method to perform object category determination according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain a training dataset. The training dataset can include a plurality of training images, a plurality of respective positions, and a plurality of respective view directions. In some implementations, the plurality of training images can be descriptive of an object of an object category in an environment. The plurality of training images can include ground truth red-green-blue values.

At 804, the computing system can process the plurality of respective positions and the plurality of respective view directions with a foreground neural radiance field model to generate a plurality of predicted foreground colors and a plurality of predicted foreground densities.

At 806, the computing system can process the plurality of respective positions and the plurality of respective view directions with a background neural radiance field model to generate a plurality of predicted background colors and a plurality of predicted background densities.

At 808, the computing system can generate one or more predicted renderings based on the plurality of predicted foreground colors, the plurality of predicted foreground densities, the plurality of predicted background colors, and the plurality of predicted background densities.

At 810, the computing system can evaluate a loss function that evaluates a difference between one or more of the plurality of training images and the one or more predicted renderings.

At 812, the computing system can adjust one or more parameters of at least one of the foreground neural radiance field model or the background neural radiance field model.

In some implementations, the computing system can receive an object output request and generate an object output based on the object output request using the foreground neural radiance field model and the background neural radiance field model. The object output comprises at least one of an instance interpolation output, a view synthesis output, or a segmentation output.

Alternatively and/or additionally, the computing system can modify one or more embedding values based at least in part on the one or more predicted renderings.

Example Implementations

Systems and methods for object category modeling can utilize Neural Radiance Fields (NeRF) to learn high quality three-dimensional object category models from collections of input images. Moreover, the systems and methods can train the object category models while simultaneously separating foreground objects from their varying backgrounds. The joint training and separation system can include a two-component NeRF model, FiG-NeRF, that prefers explanation of the scene as a geometrically constant background and a deformable foreground that represents the object category. Additionally and/or alternatively, the systems and methods can learn accurate three-dimensional object category models using photometric supervision and casually captured images of the objects. Additionally, the two-part decomposition can allow the model to perform accurate and crisp amodal segmentation. The systems and methods can be quantitatively evaluated with view synthesis and image fidelity metrics, using synthetic, lab-captured, and in-the-wild data. The results can demonstrate the systems and methods' convincing three-dimensional object category modelling that exceeds the performance of existing methods.

Learning high quality three-dimensional object category models from visual data can have a variety of applications such as in content creation and robotics. For example, trained category models may allow the systems and methods to generate realistic new object instances for graphics applications and/or may allow a robot to understand the three-dimensional structure of a novel object instance if the system had seen objects of a similar type before. Reasoning about objects in three-dimensional can enable improved performance in general perception tasks. For example, utilizing three-dimensional category models for certain tasks can enable enhanced reasoning, such as amodal segmentation which can take into account occlusions of multiple objects, or fusion of information over multiple views taken from different viewpoints.

In some implementations, the systems and methods can learn three-dimensional object category models using casually captured photography with unconstrained backgrounds and minimal supervision, using an Objectron dataset as a target for in-the-wild three-dimensional object category modelling. In some implementations, backgrounds can be different for each instance. Moreover, in some implementations, the systems and methods can include separating the object from its background as well as understand its particular shape and appearance.

In some implementations, the systems and methods can include Neural Radiance Fields (NeRF), which has shown excellent results for image-based view synthesis. Moreover, in some implementations, the systems and methods can include Figure-Ground Neural Radiance Fields (FiG-NeRF), which can use two NeRF models to model the objects and background, respectively. To enable separation of object (figure) from background (ground, as in the Gestalt principle of figure-ground perception), the systems and methods can adopt a two-component model which can include a deformable foreground model and background model with a fixed geometry and variable appearance. The systems and methods may be able to find that fixing the geometry of the background can be appropriate for the object categories studied. For example, cups typically rest on tables, and eyeglasses on faces. The two-component approach together with sparsity priors may be sufficient for the model to successfully separate modelling of a foreground object and background. Since the object category model can infer the separation between object and background, a secondary benefit, in addition to the three-dimensional object category model, can be a crisp amodal object/background segmentation. In an evaluation of the model, the evaluation can show that the quality of the segmentations outperform both Mask R-CNN and a bespoke matting algorithm that uses additional images.

The systems and methods can jointly estimate object category models whilst separating objects from their backgrounds, using a novel two-component, Deformable NeRF formulation. Additionally and/or alternatively, the systems and methods can provide an object output that results in novel-view synthesis and instance interpolation that outperforms baselines such as non-deformable NeRF variants and SRNs on both synthetic and real image datasets. The system and method evaluation can demonstrate learning of object category models in-the-wild and with variable backgrounds, using the Objectron dataset.

The systems and methods may jointly estimate detailed object category models with backgrounds of variable and view-dependent appearance, without recourse to silhouettes or two-dimensional segmentation predictions.

In some implementations, the systems and methods for Figure-Ground NeRF (FiG-NeRF) can utilize the Gestalt principle of figure-ground separation.

The systems and methods can consider a setting with a collection of N scenes, where each scene contains a single object instance. Moreover, the systems and methods can assume that the scene backgrounds have identical geometry but not necessarily identical color. For example, different table-tops/planar surfaces, or the same scene with different lighting, can satisfy the assumption. Each instance i can be captured from $M_i$ viewpoints, resulting in a dataset $D_i = \{I_i^j\}_{j=1}^{M_i}$ for each instance i=1, . . . , N. Additionally, the systems and methods can obtain and process Mbg images of a background scene with no object instance present and designate this as $D_{bg}$. The systems and methods may denote the entire dataset as $\mathcal{D} = \{\cup_{i=1}^{N}\} \cup D_{bg}$. Additionally and/or alternatively, the systems and methods can also assume that camera poses and intrinsics may be obtained for each image. The systems and methods can be obtained by standard structure-from-motion (SfM) software such as or by running visual odometry during capture. See FIG. 3 for an example of the assumed setup.

A Neural Radiance Field (NeRF) may be a function F: (x, d)→(c, σ) including one or more multi-layer perceptrons (MLP) that map a three-dimensional position x and two-dimensional viewing direction d to an RGB color c and volume density σ. F can include a trunk, followed by separate color and density branches. Point coordinates may be passed through a positional encoding layer γ(•) before being input to the MLP. In some implementations, the radiance field may be rendered using volume rendering to generate highly realistic results when trained on many views.

A drawback to NeRF can be that NeRF may only learn to model a single scene. To extend NeRF to handle multiple scenes, the systems and methods can introduce conditioning input latent codes to model object categories and the different appearances of a scene. The systems and methods can involve concatenating the inputs of the NeRF MLPs with additional latent codes that may be sampled using a GAN or optimized during training. The models may be referred to as conditional NeRFs. The systems and methods can therefore build upon conditional NeRF models to handle object categories.

Some systems utilize ground truth segmentations that define the extent of the objects. The systems and methods can be easily extracted for synthetic datasets, but the extraction may be difficult to obtain accurate segmentations for real datasets. Additionally, the systems and methods can limit the potential categories to classes that the object detector has trained on. In some implementations, the systems and methods can include a model that learns a segmentation of the scene into a foreground component containing the object of interest, and a background component in an unsupervised manner.

The systems and methods can decompose the neural radiance field into two components: a foreground component $F^f$ and a background component $F^b$, each modeled by a conditional NeRF. The foreground latent code $\psi_i$ and the background latent code $\omega_i$ can condition the foreground and background component, respectively.

Additionally and/or alternatively, the systems and methods can observe that many objects are often captured in back-grounds containing approximately the same geometry, such as cups on planar surfaces, or eyeglasses on faces. The formulation can exploit the observation and can assume that all the object instances in $\mathcal{D}$ are captured against backgrounds that share the same geometry, while their appearance might change due to texture or lighting changes. Such an assumption may not be overly restrictive, and may allow for distributed data capture (i.e., each scene can be captured by a different user (for example, tabletops in different homes)), as is the case of the Objectron dataset. Moreover, the systems and methods may incorporate this inductive bias into the network by feeding $\omega_i$ to the branch of $F^b$ that affects the appearance only, not density (geometry). Note that with this formulation, the background model can capture background surface appearance variations induced by the object, such as shadows.

More formally, the model may be composed of the conditional NeRF models:

$$F^f: (x, d, \psi_i) \rightarrow (c_f, \sigma_f) \tag{1a}$$

$$F^b: (x, d, \omega_i) \rightarrow (c_b, \sigma_b), \tag{1b}$$

where the systems and methods can learn the foreground and background latent codes using generative latent optimization (GLO).

To render images using the two-component model, the systems and methods can be configured for a ray r(t)=x+td, and the color can be computed as $$C(r) = \int_{t_n}^{t_f} T(t)(\sigma_f(t)c_f(t) + \sigma_b(t)c_b(t))dt, \tag{2}$$

where $T(t)=\exp(-f_{t_n}^t(\sigma_f(s)+\sigma_b(s))ds)$, and $t_n$, $t_f$ are the near and far integration bounds, respectively. $\sigma_k(t)$, $c_k(t)$ can be the density and color values at $r(t)$ for $k \in \{f, b\}$, respectively.

With the separation, the systems and methods can compute a foreground segmentation mask by rendering the depth of the foreground closer to the camera than the background.

In some implementations, the systems and methods can include category models to (1) allow for smooth interpolation between objects, and (2) be robust to partial observations of specific instances. Therefore, the systems and methods may leverage that instances of an object category are typically structurally very similar. For example, it may be possible to think of a generic cup, shoe, or camera without specifying a specific instance. The observation may be used to motivate methods such as morphable models which deform a canonical mesh to fit objects with small intra-class variations (e.g., faces). Inspired by the success of such methods, the systems and methods may include modelling object instances as deformations from a canonical radiance field. While morphable models may assume a shared topology and vertex structure, the systems and methods may not be bound by these limitations due to the use of a continuous, volumetric representation (i.e., NeRF).

Additionally and/or alternatively, the systems and methods may incorporate canonical object templates into the model by adapting the concept of Deformable NeRF or nerfies to modelling object categories. Deformable NeRFs may include two parts: a canonical template NeRF G, which can be a standard 5D NeRF model, and a deformation field D which can warp a point x in observation-space coordinates to a point x' in template-space. The deformation field $(x, \delta_t) \to x'$ can be a function conditioned by a deformation code $\delta_t$ defined for time step t. The systems and methods can represent the deformation with a residual translation field D such that $x'=x+D(x, \delta_t)$ where D is a coordinate-based MLP that uses a positional encoding layer.

Instead of associating deformation fields to time steps t, the model can associate a deformation field to each object instance i represented by a shape deformation code $\psi_i^s$. Because all objects may share the template NeRF model G yet may have different textures, the systems and methods can condition G with a per-instance appearance code $\psi_i^a$ that, similarly to $\omega_i$, only affects the color branch of the model. The systems and methods can define the concatenation of shape and appearance latent codes as the object instance code $\psi_i=(\psi_i^s,\psi_i^a)$ defined in the previous section.

The foreground object model can therefore include a conditional NeRF that takes the following form:

$$F_f(x,d,(\psi_i^s,\psi_i^a))=G(D(x,\psi_i^s),d,\psi_i^a). \quad (3)$$

One example implementation of a network architecture can be depicted in FIG. 2.

A photometric loss may be applied as a standard photometric L2 loss $$\ell_{fg}=\Sigma_{r \in D_{fg}}\|C(r)-\overline{C}(r)\|_2^2, \quad (4)$$

where $D_{fg}=\cup_{i=1}^N D_i$ and $\overline{C}(r)$ may be the ground truth RGB value for ray r. Additionally, to ensure the background model learns the appropriate background geometry, the systems and methods can apply the same loss to background:

$$\ell_{bg}=\Sigma_{r \in D_{bg}}\|C(r)-\overline{C}(r)\|_2^2. \quad (5)$$

The systems and methods may include a separation regularization. For example, the structure of the model (e.g., the model depicted in FIG. 2) may allow the systems and methods to disentangle foreground and background when the dataset satisfies the assumption of identical background geometry across different scenes. However, the separation may not naturally appear during the optimization, thus the systems and methods can apply a regularization loss to encourage it. Moreover, the systems and methods may consider the accumulated foreground density along a ray:

$$A_f(r)=f_{t_n}^{t_f}(T_f(t)\sigma_f(t))dt, \quad (6)$$

where $T_f(t)=\exp(-f_{t_n}^{t_f}\sigma_f(s)ds)$. In some implementations, the systems and methods can impose an L1 sparsity penalty $\ell_{sparse}=\|A_f\|_1$. The penalty can encourage $F^b$ to represent as much of the scene as possible. However, since the background model may not vary its density, $F^f$ can be forced to represent any varying geometry of the scenes, which includes the objects. Thus, the separation may not be supervised, and may occur due to this sparsity prior and model structure.

While $\ell_{sparse}$ can help to separate foreground and background, the systems and methods can tend to encourage $F^f$ to pick up artifacts such as shadows induced by the object and lighting changes. The artifacts can typically manifest as haze-like artifacts, thus the systems and methods can suppress them with a beta prior loss function denoted as:

$$\ell_{beta}=(\alpha-1)\log(A_f)+(\beta-1)\log(1-A_r), \quad (7)$$

In some example experiments, the systems and methods may set $\alpha=3$, $\beta=2$, which biases $A_f$ towards 0, which is in line with the sparsity loss.

The systems and methods may include a deformation regularization. For example, in some implementations, the systems and methods may apply a simple L2 loss on the residual translation to penalize the deformation from being arbitrarily large:

$$\ell_{warp}=\mathbb{E}[\|D(x,\psi_i^2)\|_2^2], \quad (8)$$

where the expectation may be approximated with Monte Carlo sampling at the sampled points in the volume rendering procedure.

The full loss function may be described as: $\ell_{fg}+\lambda_{bg}\ell_{bg}+\lambda_{sparse}\ell_{sparse}+\lambda_{beta}\ell_{beta}+\lambda_{warp}\ell_{warp}$.

In some implementations, a top-k schedule can be applied to $\ell_{beta}$ in order to focus on hard negatives. The system may apply the following schedule: [(50k, 0.0), (50k, 0.5), (50k, 0.25), (50k, 0.1), (1, 0.05)], where each item in the schedule (T; k), therefore, the system may apply $\ell_{beta}$ only to the top k percentage of pixels with the highest loss for T iterations. Additionally, since the Beta distribution density function can have gradients approaching infinite magnitude around {0; 1}, the system may clip the input between [1e-4; 1-1e-4] and contract (scale) the input to this loss to [-0:4; 0:4] such that there are no gradients when the input is very close to {0; 1}, and such that the maximum magnitude of the gradient isn't too large.

Additionally and/or alternatively, the systems and methods may add some randomness to the initial portion of the training procedure in order to help encourage the separation. For example, the system may perturb $\sigma_f$ and $\sigma_b$ (the foreground and background volume densities, respectively) with a N(0; 1) random variable for the first 50k iterations of training. The perturbance may help the training process avoid local minima where either the foreground or background learn the entire scene, and the other learns nothing.

In some implementations, the systems and methods may approximate the integrals in calculations with numerical quadrature. For example, the system may let $\{t_k\}_{k=1}^K$ be samples along the ray r between the near/far bounds $t_n$, $t_f$ such that $t_1 < t_2 \ldots < t_K$. The system may define $\delta_k = t_{k+1} - t_k$. To approximate $C(r)$ (e.g., Eq. (2)) with $\hat{C}(r)$, $$\hat{C}(r) = \Sigma_{k=1}^K \hat{T}(k)(\alpha(\sigma_f(t_k)\delta_k)c_f(t_k) + \alpha(\sigma_b(t_k)\delta_k)c_b(t_k)),$$

where $\hat{T}(k) = \exp(-\Sigma_{j=1}^{k-1}((\sigma_f(t_j)) + (\sigma_b(f_j)\delta_j)))$ and $\alpha(x) = 1 - \exp(-x)$.

Additionally and/or alternatively, the system may approximate $A_f(r)$ (e.g., Eq. (6)) with $\hat{A}_f(r)$ in order to apply $\ell_{sparse}$, such that:

$$\hat{A}(r) = \Sigma_{k=1}^K \hat{T}_f(k)(\alpha(\sigma_f(t_k)\delta_k))$$

where $\hat{T}_f(k) = \exp(-(\Sigma_{j=1}^{k-1}((\sigma_f(t_j)\delta_j)))$.

For the background model and foreground template, the systems and methods may use a positional encoding with 10 frequencies (e.g., as used in an original NeRF). For the deformation field, the systems and methods may use 10 frequencies for the spatial encoding on CARS and GLASSES since they can exhibit high frequency geometry such as spoilers, side mirrors, and thin frames, while the systems and methods may use 4 frequencies for CUPS since they typically do not exhibit high frequency geometry. Additionally and/or alternatively, the viewing directions may use a positional encoding with 4 frequencies.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising:
    obtaining, by a computing system comprising one or more processors, an input dataset, wherein the input dataset comprises an input position and an input view direction;
    processing, by the computing system, the input dataset with a foreground neural radiance field model to generate a foreground output, wherein the foreground output comprises a foreground color output and a foreground density output;
    processing, by the computing system, the input dataset with a background neural radiance field model to generate a background output, wherein the background output comprises a background color output and a background density output; and
    generating, by the computing system, a rendering based at least in part on the foreground output and the background output.

2. The method of claim 1, wherein the input dataset further comprises a foreground shape embedding, a foreground appearance embedding, and a background appearance embedding;
    wherein the foreground output is generated based at least in part on the foreground shape embedding and the foreground appearance embedding; and
    wherein the background output is generated based at least in part on the background appearance embedding.

3. The method of claim 1, wherein the input dataset comprises one or more embeddings and wherein the method further comprises:
    generating, by the computing system, an instance interpolation output based at least in part on the foreground output, the background output, and the one or more embeddings.

4. The method of claim 1, wherein the foreground neural radiance field model comprises a deformation field model and a foreground template model, wherein the deformation field model is configured to warp a first point in observation-space coordinates to a second point in template-space, and wherein the foreground template model is configured to process position and direction to generate a neural radiance field output comprising a color and a volume density.

5. The method of claim 1, wherein the background neural radiance field model comprises a background template model, wherein the background template model is configured to process position data and direction data to generate a neural radiance field output comprising color data and volume density data.

6. The method of claim 1, wherein at least one of the foreground output or the background output comprises data descriptive of a color probability distribution and a volume density probability distribution.

7. The method of claim 1, wherein the rendering comprises an object in an environment.

8. The method of claim 1, wherein generating the rendering comprises fixing a geometry of a background embedding before concatenating the foreground output and the background output.

9. The method of claim 1, wherein the foreground neural radiance field model is trained with a training dataset descriptive of an object category.

10. The method of claim 9, wherein the training dataset comprises ground truth image data descriptive of a ground truth image, a three-dimensional position, and a view direction.

11. The method of claim 9, wherein the training dataset comprises background image data descriptive of an environment without an object of the object category.

12. The method of claim 1, wherein processing the input dataset with a foreground neural radiance model to generate the foreground output comprises:
    processing, by the computing system, the input position and the input view direction with a multi-layer perceptron to map the input position and the input view direction to a red-green-blue color value and a volume density; and
    generating, by the computing system, the foreground output based at least in part on the red-green-blue color value and the volume density.

13. The method of claim 1, wherein the foreground neural radiance field model and the background neural radiance field model are trained with a photometric loss, a separation regularization, and a deformation regularization.

14. A computing system, the computing system comprising:
- one or more processors; and
- one or more non-transitory computer-readable media that collectively store instructions, when executed by the one or more processors, cause the computing system to perform operations, the operations comprising:
  - obtaining a training dataset, wherein the training dataset comprises a plurality of training images, a plurality of respective positions, and a plurality of respective view directions, wherein the plurality of training images are descriptive of an object of an object category in an environment;
  - processing the plurality of respective positions and the plurality of respective view directions with a foreground neural radiance field model to generate a plurality of predicted foreground colors and a plurality of predicted foreground densities;
  - processing the plurality of respective positions and the plurality of respective view directions with a background neural radiance field model to generate a plurality of predicted background colors and a plurality of predicted background densities; and
  - generating one or more predicted renderings based on the plurality of predicted foreground colors, the plurality of predicted foreground densities, the plurality of predicted background colors, and the plurality of predicted background densities;
  - evaluating a loss function that evaluates a difference between one or more of the plurality of training images and the one or more predicted renderings; and
  - adjusting one or more parameters of at least one of the foreground neural radiance field model or the background neural radiance field model based on the loss function.

15. The computing system of claim 14, wherein the operations further comprise:
- receiving an object output request; and
- generating an object output based on the object output request using the foreground neural radiance field model and the background neural radiance field model, wherein the object output comprises at least one of an instance interpolation output, a view synthesis output, or a segmentation output.

16. The computing system of claim 14, wherein the operations further comprise modifying one or more embedding values based at least in part on the one or more predicted renderings.

17. The computing system of claim 14, wherein the plurality of training images comprise ground truth red-green-blue values, and wherein the loss function comprises a photometric loss.

18. One or more non-transitory computer-readable media that collectively store instructions that, when executed by one or more computing devices, cause the one or more computing devices to perform operations, the operations comprising:
- obtaining a training dataset, wherein the training dataset comprises one or more training images, one or more respective positions, and one or more respective view directions, wherein the one or more training images are descriptive of an object category;
- processing the one or more respective positions and the one or more respective view directions with a foreground neural radiance field model to generate one or more predicted foreground outputs, wherein the one or more predicted foreground outputs comprise one or more predicted foreground color distributions and one or more predicted foreground density distributions;
- processing the one or more respective positions and the one or more respective view directions with a background neural radiance field model to generate one or more predicted background outputs, wherein the one or more predicted background outputs comprises one or more predicted background color distributions and one or more predicted background density distributions;
- generating one or more predicted object outputs based on the one or more predicted foreground outputs and the one or more predicted background outputs;
- evaluating a loss function that evaluates a difference between the one or more training images and the one or more predicted object outputs; and
- adjusting one or more parameters of at least one of the foreground neural radiance field model or the background neural radiance field model.

19. The one or more non-transitory computer-readable media of claim 18, further comprising:
- receiving latent encoding data and an output request; and
- generating an object interpolation with the foreground neural radiance field model based at least in part on the latent encoding data and the output request.

20. The one or more non-transitory computer-readable media of claim 18, further comprising:
- obtaining one or more input images, wherein the one or more input images comprise an input object of the object category and an input environment;
- processing the one or more input images with the foreground neural radiance field model and the background neural radiance field model to generate a segmentation output; and
- providing the segmentation output for display, wherein the segmentation output comprises the input object without the input environment.

\* \* \* \* \*